(12) United States Patent
Yeh et al.

(10) Patent No.: US 9,548,925 B2
(45) Date of Patent: Jan. 17, 2017

(54) EVALUATING THE RELIABILITY OF DETERIORATION-EFFECT MULTI-STATE FLOW NETWORK SYSTEM AND METHOD THEREOF

(71) Applicant: NATIONAL TSING HUA UNIVERSITY, Hsinchu (TW)

(72) Inventors: Wei-Chang Yeh, Hsinchu (TW); Yuan-Ming Yeh, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 380 days.

(21) Appl. No.: 14/195,071

(22) Filed: Mar. 3, 2014

(65) Prior Publication Data

US 2015/0049619 A1 Feb. 19, 2015

(30) Foreign Application Priority Data

Aug. 13, 2013 (TW) .............................. 102129065 A

(51) Int. Cl.
*H04L 12/801* (2013.01)
*H04L 12/721* (2013.01)
*H04L 12/24* (2006.01)
*H04L 12/751* (2013.01)

(52) U.S. Cl.
CPC ............ *H04L 47/12* (2013.01); *H04L 41/0836* (2013.01); *H04L 45/14* (2013.01); *H04L 45/02* (2013.01)

(58) Field of Classification Search
CPC ................. H04L 41/0836; H04L 45/14; H04L 47/12–47/127
See application file for complete search history.

(56) References Cited

U.S. PATENT DOCUMENTS

| | | | | |
|---|---|---|---|---|
| 6,977,931 B1* | 12/2005 | Hadziomerovic | ...... | H04L 45/02 370/238 |
| 2007/0140114 A1* | 6/2007 | Mosko | ................ | H04L 12/2602 370/229 |
| 2009/0175171 A1* | 7/2009 | Nikolova | ................ | H04L 45/12 370/238 |
| 2012/0079089 A1* | 3/2012 | Lin | ..................... | H04L 41/0836 709/223 |

\* cited by examiner

*Primary Examiner* — Hoon J Chung

(57) ABSTRACT

A system of evaluating the reliability of deterioration-effect multi-state flow network and method thereof are disclosed in present invention. The system can evaluate the probability that d units of data of flow can be transmitted from a source node to a sink node. In practical application, the flow in a deterioration-effect multi-state flow network may undergo a loss due to deterioration. For example, electrical power will decrease if the transmission distance is too great. Therefore, how to evaluate the reliability of deterioration-effect multi-state flow network becomes an important issue.

6 Claims, 7 Drawing Sheets

| Deterioration-effect rate | $0 \leq x_1 \leq 4$ | $0 \leq x_2 \leq 4$ | $0 \leq x_3 \leq 2$ | $0 \leq x_4 \leq 2$ | $0 \leq x_5 \leq 2$ | $0 \leq x_6 \leq 2$ |
|---|---|---|---|---|---|---|
| | 0.9 | 0.95 | 0.85 | 0.85 | 0.9 | 0.85 |
| 1 | 3.33333 | 3.15789 | 0 | 0 | 0 | 0 |
| 2 | 2.22222 | 3.15789 | 0 | 1.17647 | 1.111111 | 0 |
| 3 | 2.22222 | 2.10526 | 0 | 0 | 1.111111 | 1.17647 |
| 4 | 3.33333 | 2.10526 | 1.17647 | 0 | 0 | 1.17647 |

FIG. 4

| Arc | Integral quantity of the input flow | Probability distribution |
|---|---|---|
| $e_1, e_2$ | 4 | .75 |
| | 3 | .10 |
| | 2 | .5 |
| | 1 | .5 |
| | 0 | .5 |
| $e_3, e_4$ | 2 | .85 |
| | 1 | .10 |
| | 0 | .05 |
| $e_5$ | 2 | .90 |
| | 1 | .05 |
| | 0 | .05 |
| $e_6$ | 2 | .80 |
| | 1 | .15 |
| | 0 | .05 |

FIG. 6

EVALUATING THE RELIABILITY OF DETERIORATION-EFFECT MULTI-STATE FLOW NETWORK SYSTEM AND METHOD THEREOF

CROSS-REFERENCE TO RELATED APPLICATION

This application claims priority from Taiwan Patent Application No. 102129065, filed on Aug. 13, 2013 in Taiwan Intellectual Property Office, the contents of which are hereby incorporated by reference in their entirety.

BACKGROUND OF THE INVENTION

1. Field of the Invention

The present invention is related to a network reliability evaluating system and method thereof, and particularly is related to an system for evaluating the reliability of a deterioration-effect multi-state flow network, and method thereof.

2. Description of the Related Art

A traditional flow network model comprises a plurality of nodes and a plurality of arcs that connect with the plurality of nodes. Many complex systems and projects can be presented via the flow network model easily, so policy-makers apply the flow network model to manage the complex systems and projects. Among all, one of the most effective decision-analyzing tools is to evaluate the network reliability.

Users often use the network reliability to measure the performance of a system, such as computer communication systems, mobile-phone network systems, petroleum transportation pipeline systems, electricity transportation systems, or computer network systems. In prior arts, when performances of various systems are measured, it is assumed that the data will not lost or damage when it is transmitted via arcs, so the network reliability can be evaluated. However, in a real world, the data loss or damage happens during transmission of the arcs in the systems, for example, the petroleum transportation pipeline systems, the electricity transportation systems, and the water transportation systems. Therefore, how to calculate the reliability of the flow network whose arcs have a data loss becomes an important issue. The flow network model whose arcs have a data loss is defined formally as a deterioration-effect multi-state flow network.

According to the above problem in the prior arts, a novel evaluating system and method thereof to evaluate the reliability of a deterioration-effect multi-state flow network are needed. With the evaluating system and method thereof, the issue of data loss during transmission of the arcs in the real system can be solved.

SUMMARY OF THE INVENTION

The embodiment of the present invention is to evaluate the reliability of the deterioration-effect multi-state flow network system. A real system's performance deteriorated during data transmission can be evaluated in the invention. And, based on the evaluation, a sufficient cost can be evaluated precisely.

An evaluating system for the reliability of a deterioration-effect multi-state flow network comprising a plurality of nodes and a plurality of arcs deteriorated during data transmission is provided. The plurality of nodes are connected by the plurality of arcs, and the evaluating system is used to evaluate a reliability of transmitting M units of data from a source node of the plurality of nodes via at least one of the plurality of nodes and at least one of the plurality of arcs to a sink node of the plurality of nodes and the sink node receiving at least N units of data from a plurality of paths. N and M are positive integers and M is greater than N. The evaluating system comprises a candidate path computing unit, a reliability computing unit. The candidate path computing unit adapted to generate a plurality of first candidate paths that transmit the M units of data from the source node via at least one of a plurality of first arcs to the sink node receiving the M units of data under the assumption that there is no deterioration for each arc, and to obtain a plurality of invalid paths that transmit the M units of data from the source node of the plurality of first candidate paths to the sink node of the plurality of first candidate paths, and to generate a plurality of second candidate paths by removing the plurality of invalid paths from the plurality of first candidate paths. Each of the plurality of invalid paths comprises at least one of second arcs whose quantity of the input flow is greater than or equal to a maximum unit of data which can be carried by the second arc. The reliability computing unit is adapted to divide the quantity of the output flow of each arc of the plurality of second candidate paths by a deterioration-effect rate of each arc of the plurality of second candidate paths correspondingly to obtain the quantity of the input flow of each arc of the plurality of second candidate paths, and the quantity of the input flow is applied by a ceiling function to generate an integral quantity of the input flow, and the reliability of the plurality of second candidate paths is evaluated according to the integral quantity of the input flow of each arc of the plurality of second candidate paths and a probability distribution corresponding to the integral quantity of the input flow. The quantity of the input flow being a positive rational.

Furthermore, the deterioration-effect rate is a ratio of the quantity of the input flow transmitted stably by each of the plurality of arcs to the maximum quantity of the input flow transmitted by each of the plurality of arcs correspondingly.

Furthermore, the reliability computing unit computes a sum of the first reliabilities of the plurality of second candidate paths and subtracts the sum by second reliabilities of intersected paths of the plurality of second candidate paths according to the principle of inclusion-exclusion, so as to obtain the reliability.

An evaluating method for the reliability of a deterioration-effect multi-state flow network comprising a plurality of nodes and a plurality of arcs deteriorated during data transmission, and the plurality nodes are connected by the plurality of the arcs. The evaluating method is used to evaluate a reliability of transmitting M units of data from a source node of the plurality of nodes via at least one of the plurality of nodes and at least one of the plurality of arcs to a sink node of the plurality of nodes and the sink node receiving at least N units of data from a plurality of paths, and N and M are positive integers and M is greater than N. The evaluating method comprises the following steps of: generating a plurality of first candidate paths that transmit the M units of data from the source node via at least one of the plurality of first arcs to the sink node receiving the M units of data under the assumption that there is no deterioration for each arc; obtaining a plurality of invalid paths that transmit the M units of data from the source node of the plurality of first candidate paths to the sink node of the plurality of first candidate paths, and generating a plurality of second candidate paths by removing the plurality of invalid paths from the plurality of first candidate paths, wherein each of the plurality of invalid paths comprises at least one of second arcs whose quantity of the input flow is greater than or equal to a maximum unit of data which can be carried by the second arc; dividing the quantity of output flow of each arc of the plurality of second candidate paths by a deterioration-effect rate of each arc of the plurality of second candidate paths correspondingly to obtain the quantity of the input flow of each arc of the plurality of second candidate paths; generating an integral quantity of the input flow by applying a ceiling function to the quantity of the input flow; and evaluating the reliability of the plurality of second candidate paths according to the integral quantity of the input flow of each arc of the plurality of second candidate paths and a probability distribution corresponding to the integral quantity of the input flow, wherein the quantity of the input flow is a positive rational.

Furthermore, the deterioration-effect rate is a ratio of the quantity of the input flow transmitted stably by each of the plurality of arcs to the maximum quantity of the input flow transmitted by each of the plurality of arcs correspondingly.

Furthermore, a sum of first reliabilities of the plurality of second candidate paths is computed and the sum is subtracted by second reliabilities of intersected paths of the plurality of second candidate paths according to the principle of inclusion-exclusion, so as to obtain the reliability.

BRIEF DESCRIPTION OF THE DRAWINGS

FIG. 4 is a third view of an evaluating system of deterioration-effect multi-state flow network according to the first embodiment of the present application.

FIG. 6 is a fifth view of an evaluating system of deterioration-effect multi-state flow network according to the first embodiment of the present application.

DETAILED DESCRIPTION OF THE PREFERRED EMBODIMENTS

Figure 1:
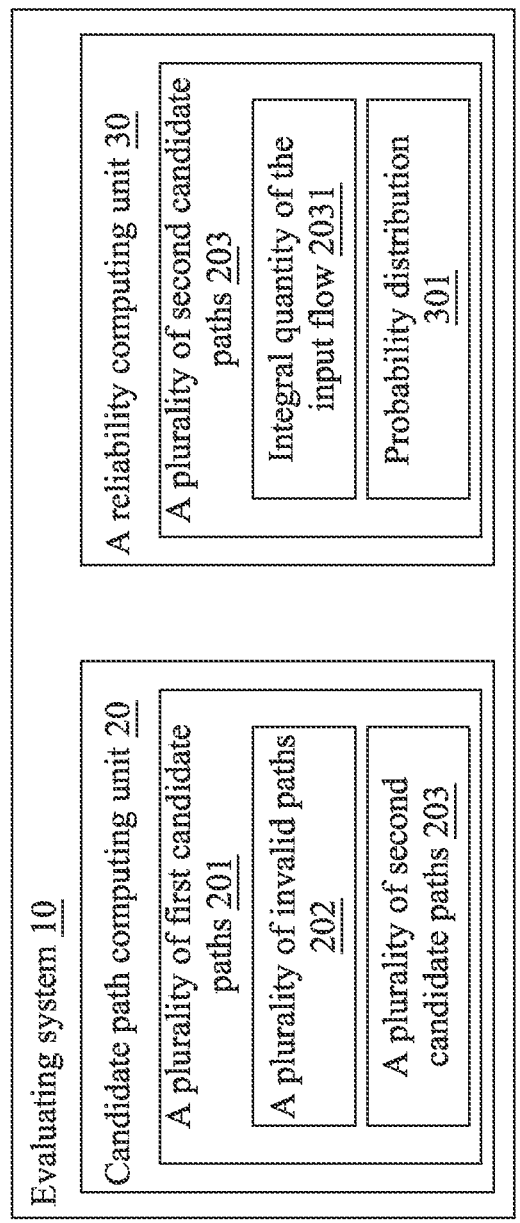
FIG. 1 is a block diagram of an evaluating system of deterioration-effect multi-state flow network according to an embodiment of the present application.

The technical characteristics, contents, advantages and effects of the present invention will be apparent with the detailed description of a preferred embodiment accompanied with related drawings as follows. It is noteworthy that same numerals are used for representing respective same elements in the drawings.

Referring to FIG. 1, FIG. 1 is a block diagram of an evaluating system of deterioration-effect multi-state flow network according to an embodiment of the present application. As shown in FIG. 1, the evaluating system 10 is installed on a computer or a server and it comprises a candidate path computing unit 20 and a reliability computing unit 30. The candidate path computing unit 20 and the reliability computing unit 30 belong to one kind of software programs. The candidate path computing unit 20 comprises a plurality of first candidate paths 201, a plurality of invalid paths 202, and a plurality of second candidate paths 203. The reliability computing unit 30 comprises the plurality of second candidate paths 203 and a probability distribution 301 mapped to each arc of the plurality of second candidate paths 203.

When a deterioration-effect multi-state flow network containing a plurality of nodes and a plurality of arcs deteriorated during data transmission is input to the evaluating system 10, the plurality of first candidate paths 201 are generated in the evaluating system 10. Assumed that each arc has no deteriorations during data transmission, the plurality of first candidate paths 201 are a set of paths transmitting M units of data from a source node to a sink node in the deterioration-effect multi-state flow network. Then, finding the plurality of invalid paths 202 from the plurality of first candidate paths 201, wherein the plurality of invalid paths 202 comprises at least one arc whose quantity of the input flow is greater than or equal to a maximum unit of data can be carried by this arc. Finally, the plurality of second candidate paths 203 are generated by removing the plurality of invalid paths 202 from the plurality of first candidate paths 201.

In the reliability computing unit 30, the quantity of the input flow of each arc of the plurality of second candidate paths 203 is equal to the quantity of the output flow of each arc of the plurality of second candidate paths 203 divided by a deterioration-effect rate of the arc of the plurality of second candidate paths 203 correspondingly. The quantity of the input flow is applied by a ceiling function to obtain an integral quantity of the input flow 2031. Finally, the probability distribution of the plurality of second candidate paths 203 are evaluated according to the integral quantity of the input flow 2031 of each arc of the plurality of second candidate paths 203 and a probability distribution 301 corresponding to each arc of the plurality of second candidate paths 203. At the same time, the reliability for the deterioration-effect multi-state flow network is also computed.

Figure 2:
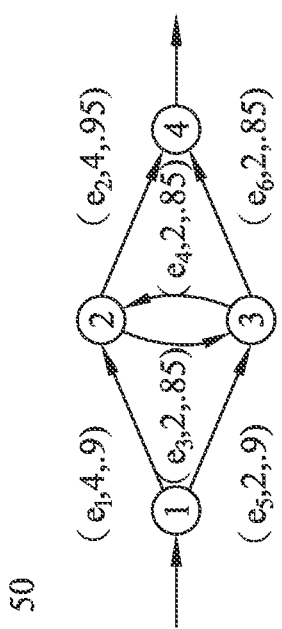
FIG. 2 is a first view of an evaluating system of deterioration-effect multi-state flow network according to a first embodiment of the present application.
Figure 3:
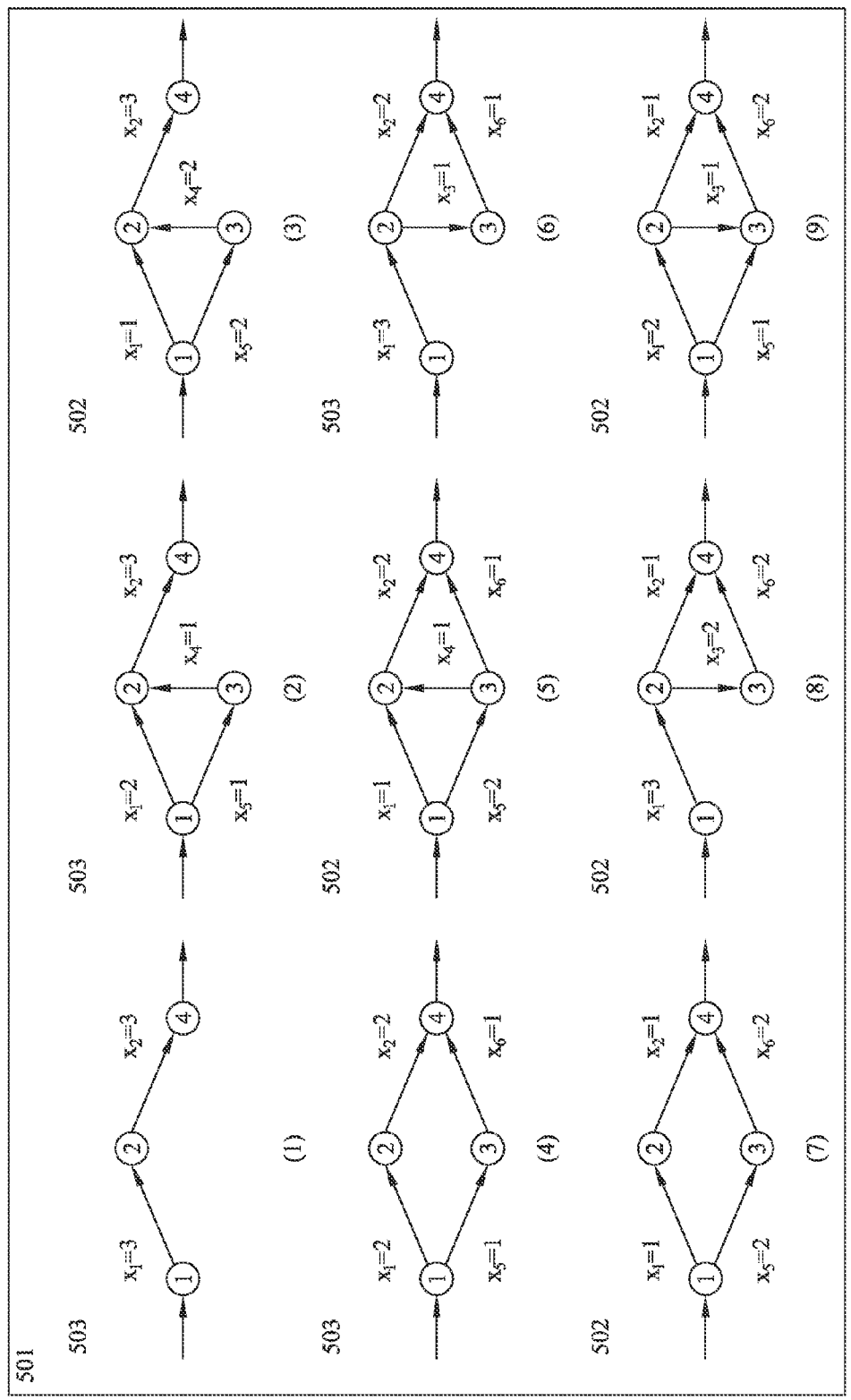
FIG. 3 is a second view of an evaluating system of deterioration-effect multi-state flow network according to the first embodiment of the present application.
Figure 5:
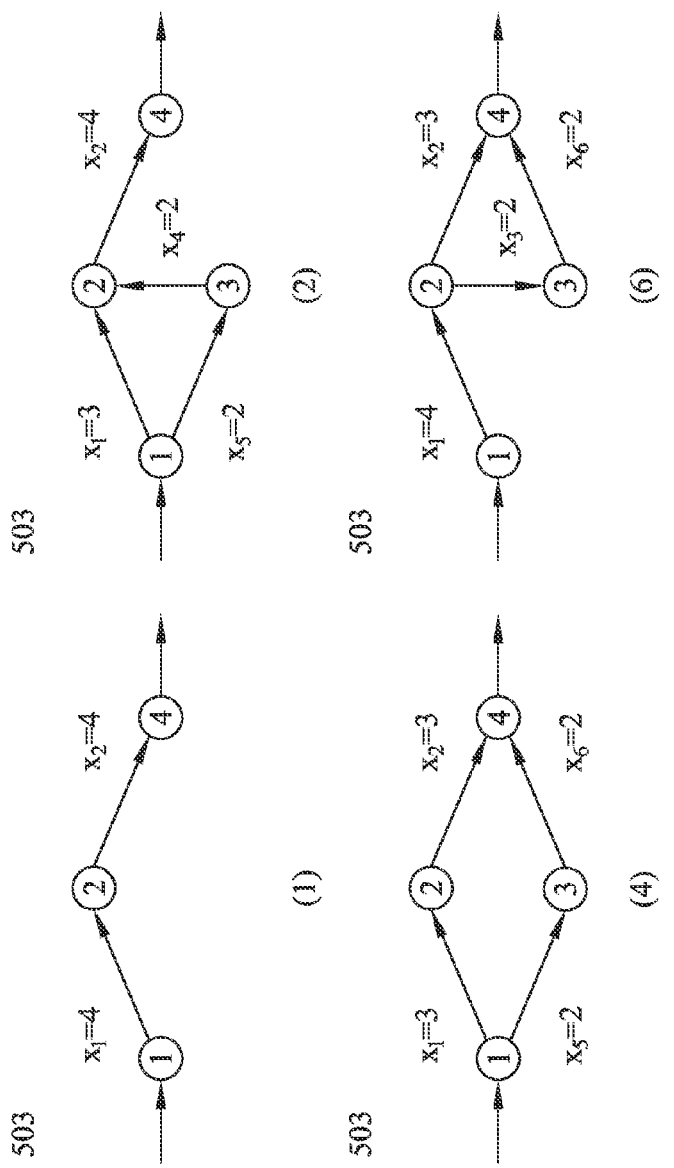
FIG. 5 is a fourth view of an evaluating system of deterioration-effect multi-state flow network according to the first embodiment of the present application.

To make it understandable easily, the embodiment of the evaluating system of a deterioration-effect multi-state flow network is described in the following figures. FIG. 2 is the first view of the evaluating system of the deterioration-effect multi-state flow network. FIG. 3 is the second view of the evaluating system of the deterioration-effect multi-state flow network, FIG. 4 is the third view of the evaluating system of the deterioration-effect multi-state flow network, FIG. 5 is the fourth view of the evaluating system of the deterioration-effect multi-state flow network, and FIG. 6 is the fifth view of the evaluating system of the deterioration-effect multi-state flow network.

Please refer to FIG. 2. As shown in FIG. 2, the deterioration-effect multi-state flow network contains four nodes (1, 2, 3, 4) and six arcs (e1, e2, e3, e4, e5, e6), wherein node 1 is a source node for transmitting data and node 4 is a sink node for receiving data. The direction of the arrow on an arc indicates the direction of data transmission. There are three variables in each arc, the first one is a name of the arc, the second one is a maximum unit of data that can be transmitted by the arc, and third one is a deterioration-effect rate of the arc when the data is carried by the arc.

Please refer to FIG. 3 through FIG. 6. The evaluating system evaluates a reliability for the deterioration-effect multi-state flow network in which the sink node has to receive at least 3 units of data in FIG. 2. As shown in FIG. 3, it assumed that arcs in the deterioration-effect multi-state flow network have no deteriorations during data transmission. In other words, the deterioration-effect multi-state flow network is regarded as a traditional network model. By using the technique in the prior art, (W. C. Yeh, Search for all d-Mincuts of a limited-flow network, Computers & Operations Research, 29(2002), 1843-1858), nine paths of a set of first candidate paths 501 are obtained in FIG. 3, where xi denotes the quantity of units of data transmission on an arc ei. Besides, four paths of a set of second candidate paths 503 are generated by removing five paths of a set of invalid paths 502 from the nine paths of the set of first candidate paths 501, where an invalid path of first candidate paths denotes that the quantity of units of data transmission on one of arcs of the invalid path is greater than or equal to a maximum unit of data can be carried by the arc. For example, the quantity of unit of data transmission on the fourth arc e4 of the third path of the set of first candidate paths 501 is equal to the maximum unit of data can be carried by e4, so the third path of the set of first candidate paths 501 is regarded as the invalid path, and the third path of the set of first candidate paths 501 is removed from the nine paths of the set of first candidate paths 501. For the same reason, the fifth path of the set of first candidate paths 501, the seventh path of the set of first candidate paths 501, the eighth path of the first candidate path 501, and the ninth path of the set first candidate paths 501 are removed from the nine paths of the set of first candidate paths 501. Therefore, the first path of the set of first candidate paths 501, the second path of the set of first candidate paths 501, the fourth path of the set of first candidate paths 501, and the sixth path of the set of first candidate paths 501 are included in the set of second candidate paths 503.

As shown in FIG. 4, the quantity of the input flow received from an arc can be computed by using the deterioration-effect rate of the arc of the set of second candidate paths 503. For example, in the set of second candidate paths 503, the quantity of the input flow 3.15789 of e2 is equal to the quantity of unit of data transmission 3 divided by the deterioration-effect rate 0.95 of e2. The quantity of the input flow 3.3333 of e1 is equal to the quantity of unit of data transmission 3 divided by the deterioration-effect rate 0.9 of e1. With the same way, the quantities of the input flow of all arcs of the set of second candidate paths 503 are computed.

As shown in (a) part of FIG. 5, the quantities of the input flow of all arcs of the set of second candidate paths 503 apply a ceiling function to generate the integral quantities of the input flow. For example, the quantity of the input flow 3.33333 of e1 becomes the integral quantity of the input flow 4 and the quantity of the input flow 3.15789 of e2 becomes the integral quantity of the input flow 4. As shown in (b) part of FIG. 5, the integral quantities of the input flow are illustrated on the arcs of the set of second candidate paths 503 correspondingly.

FIG. 6 shows a probability distribution of the integral quantity of input flow of arcs. According to the principle of inclusion-exclusion in combinatorial mathematics, a sum of the first reliabilities of the set of second candidate paths 503 is computed and the sum is subtracted by second reliabilities of intersected paths of the set of second candidate paths 503, so as to obtain the reliability for the deterioration-effect multi-state flow network. In detail, the reliability is 0.793275 (0.793275=[Pr{X1}+Pr{X2}+Pr{X3}+Pr{X4}]−[Pr{X1∩X2}+Pr{X1∩X4}+Pr{X1∩X6}+Pr{X2∩X4}+Pr{X2∩X6}+Pr{X4∩X6}]+[Pr{X1∩X2∩X4}+Pr{X1∩X2∩X6}+Pr{X1∩X4∩X6}+Pr{X2∩X4∩X6}]−[Pr{X1∩X2∩X4∩X6}]), where the Pr(Xi) denotes a probability distribution of the integral quantity of the input flow of the arc of the i-th path of the set of second candidate paths 503, Pr(Xi∩Xj) denotes a probability distribution of arcs that are intersected between the i-th path and the j-th path of the set of second candidate paths 503, i∈{1, 2, 4, 6}, j∈{1, 2, 4, 6}, i≠j.

Figure 7:
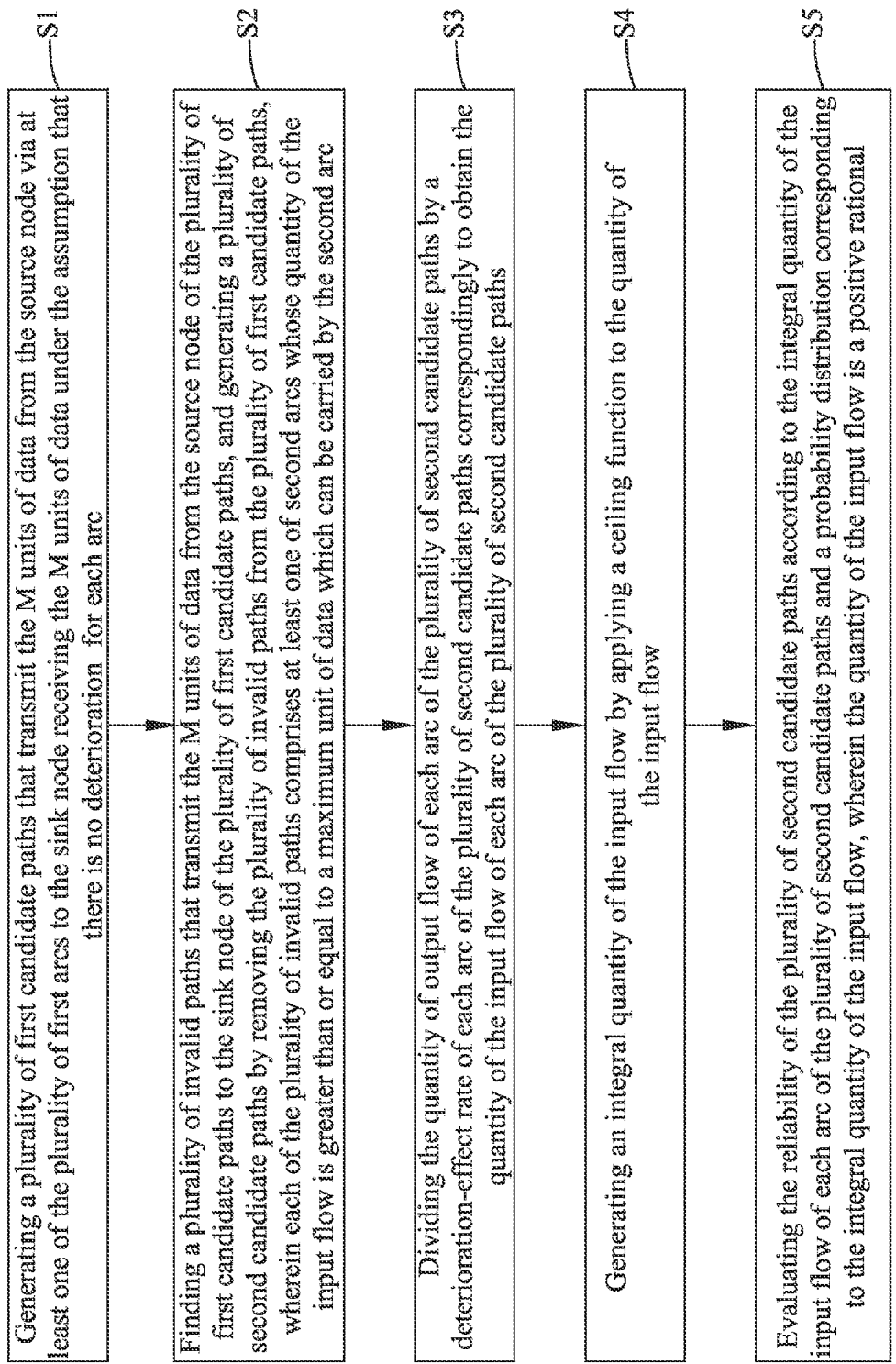
FIG. 7 is a flow chart of an evaluating method of deterioration-effect multi-state flow network according to a second embodiment of the present application.

FIG. 7 is the flow chart of an evaluating method of deterioration-effect multi-state flow network according to a second embodiment of the present application. The evaluating method includes following steps. In step S1, in the deterioration-effect multi-state flow network, a plurality of first candidate paths are generated, that transmit the M units of data from the source node via at least one of the plurality of first arcs to the sink node receiving the M units of data under the assumption that there is no deterioration for each arc, where M is a positive integer. In step S2, a plurality of invalid paths are obtained, that transmit the M units of data from the source node of the plurality of first candidate paths to the sink node of the plurality of first candidate paths. a plurality of second candidate paths are generated by removing the plurality of invalid paths from the plurality of first candidate paths, and each of the plurality of invalid paths comprises at least one of second arcs whose quantity of the input flow is greater than or equal to a maximum unit of data can be carried by the second arc. In step S3, the quantity of output flow of each arc of the plurality of second candidate paths are divided by a deterioration-effect rate of each arc of the plurality of second candidate paths correspondingly to obtain the quantity of the input flow of each arc of the plurality of second candidate paths. In step S4, an integral quantity of the input flow is generated by applying a ceiling function to the quantity of the input flow. Finally, in step S5, the reliability of the plurality of second candidate paths is evaluated according to the integral quantity of the input flow of each arc of the plurality of second candidate paths and a probability distribution corresponding to the integral quantity of the input flow. And, the reliability of the deterioration-effect multi-state flow network can be computed.

The aforementioned preferred embodiment is to explain the technical ideas and features of the present application. The purpose is to enable those who skilled in this technical area to understand the content of the present application and realize it. It will be understood that the present application is not limited to the details thereof. Various equivalent variations and modifications may still occur to those skilled in this art in view of the teachings of the present application. Thus, all such variations and equivalent modifications are also embraced with the scope of the present application as defined in the appended claim.

What is claimed is:

1. An evaluating system for the reliability of a deterioration-effect multi-state flow network which comprises a plurality of nodes and a plurality of arcs deteriorated during data transmission, the plurality of nodes connected by the plurality of arcs, and the evaluating system being used to evaluate a reliability of transmitting M units of data from a source node of the plurality of nodes via at least one of the plurality of nodes and at least one of the plurality of arcs to a sink node of the plurality of nodes and the sink node receiving at least N units of data from a plurality of paths, and N and M being positive integers and M being greater than N, the evaluating system comprising:
a memory device; and
a processor coupled to the memory device, the processor configured to execute a plurality of computing units stored in the memory device, the plurality of computing units comprising:

a candidate path computing unit, adapted to generate a plurality of first candidate paths that transmit the M units of data from the source node via at least one of a plurality of first arcs of the plurality of arcs to the sink node receiving the M units of data under the assumption that there is no deterioration for each arc, and to obtain a plurality of invalid paths that transmit the M units of data from the source node of the plurality of first candidate paths to the sink node of the plurality of first candidate paths, and to generate a plurality of second candidate paths by removing the plurality of invalid paths from the plurality of first candidate paths, wherein each of the plurality of invalid paths comprises at least one of second arcs of the plurality of arcs whose quantity of the input flow is greater than or equal to a maximum unit of data which can be carried by the at least one of the second arcs; and a reliability computing unit, adapted to divide the quantity of the output flow of each arc of the plurality of second candidate paths by a deterioration-effect rate of each arc of the plurality of second candidate paths correspondingly to obtain the quantity of the input flow of each arc of the plurality of second candidate paths, and the quantity of the input flow being applied by a ceiling function to generate an integral quantity of the input flow, and the reliability of the plurality of second candidate paths being evaluated according to the integral quantity of the input flow of each arc of the plurality of second candidate paths and a probability distribution corresponding to the integral quantity of the input flow, wherein the quantity of the input flow being a positive rational.

2. The evaluating system of claim 1, wherein the deterioration-effect rate is a ratio of the quantity of the input flow transmitted stably by each of the plurality of arcs to the maximum quantity of the input flow transmitted by each of the plurality of arcs correspondingly.

3. The evaluating system of claim 1, wherein the reliability computing unit computes a sum of first reliabilities of the plurality of second candidate paths and subtracts the sum by second reliabilities of intersected paths of the plurality of second candidate paths according to the principle of inclusion-exclusion, so as to obtain the reliability.

4. A non-transitory computer-readable storage medium having instructions stored thereon that, when executed by a processor, cause the processor to perform an evaluating method for the reliability of a deterioration-effect multi-state flow network which comprises a plurality of nodes and a plurality of arcs deteriorated during data transmission, the plurality nodes connected by the plurality of the arcs, and the evaluating method being used to evaluate a reliability of transmitting M units of data from a source node of the plurality of nodes via at least one of the plurality of nodes and at least one of the plurality of arcs to a sink node of the plurality of nodes and the sink node receiving at least N units of data from a plurality of paths, and N and M being positive integers and M being greater than N, the evaluating method comprising the following steps of:

generating a plurality of first candidate paths that transmit the M units of data from the source node via at least one of a plurality of first arcs of the plurality of arcs to the sink node receiving the M units of data under the assumption that there is no deterioration for each arc;

obtaining a plurality of invalid paths that transmit the M units of data from the source node of the plurality of first candidate paths to the sink node of the plurality of first candidate paths, and generating a plurality of second candidate paths by removing the plurality of invalid paths from the plurality of first candidate paths, wherein each of the plurality of invalid paths comprises at least one of second arcs of the plurality of arcs whose quantity of the input flow is greater than or equal to a maximum unit of data which can be carried by the at least one of the second arcs;

dividing the quantity of output flow of each arc of the plurality of second candidate paths by a deterioration-effect rate of each arc of the plurality of second candidate paths correspondingly to obtain the quantity of the input flow of each arc of the plurality of second candidate paths;

generating an integral quantity of the input flow by applying a ceiling function to the quantity of the input flow; and evaluating the reliability of the plurality of second candidate paths according to the integral quantity of the input flow of each arc of the plurality of second candidate paths and a probability distribution corresponding to the integral quantity of the input flow, wherein the quantity of the input flow is a positive rational.

5. The non-transitory computer-readable storage medium of claim 4, wherein the deterioration-effect rate is a ratio of the quantity of the input flow transmitted stably by each of the plurality of arcs to the maximum quantity of the input flow transmitted by each of the plurality of arcs correspondingly.

6. The non-transitory computer-readable storage medium of claim 4, wherein a sum of first reliabilities of the plurality of second candidate paths is computed and the sum is subtracted by second reliabilities of intersected paths of the plurality of second candidate paths according to the principle of inclusion-exclusion, so as to obtain the reliability.

* * * * *